United States Patent [19]

Bischoff et al.

[11] Patent Number: 5,117,782
[45] Date of Patent: Jun. 2, 1992

[54] AIR INTAKE AND CONDITIONING SYSTEM FOR INTERNAL COMBUSTION ENGINES

[76] Inventors: George H. Bischoff, Star Rte. Box 163, Leeper, Pa. 16233; Raymond A. Judy, Box 24, Lucinda, Pa. 16235

[21] Appl. No.: 648,127

[22] Filed: Jan. 30, 1991

[51] Int. Cl.[5] .................... F02M 31/20; F02M 25/00
[52] U.S. Cl. ............................... 123/1 A; 123/52 M; 123/470; 123/540
[58] Field of Search .................. 123/1 A, 52 M, 470, 123/472, 540, 542, 575

[56] References Cited

U.S. PATENT DOCUMENTS

| | | | |
|---|---|---|---|
| 2,791,205 | 5/1957 | Platner et al. | 123/55 VE |
| 3,441,011 | 4/1969 | Karl | 123/542 |
| 3,635,201 | 1/1972 | High | 123/339 |
| 3,943,904 | 3/1976 | Byrne | 123/472 X |
| 4,402,296 | 9/1983 | Schwarz | 123/575 |
| 4,495,930 | 1/1985 | Nakajima | 123/575 |
| 4,546,732 | 10/1985 | Mae et al. | 123/575 X |

Primary Examiner—Tony M. Argenbright
Attorney, Agent, or Firm—Clifford A. Poff

[57] ABSTRACT

Method and apparatus for increasing the efficiency and the performance of normally aspirated internal combustion engines. A combustion air intake housing including a fuel injector for introducing an atomized spray of highly volatile, preferably non-petroleum based, combustible fuel in a region of convergence of a plurality of convergent, progressively operated intake ports formed in the air intake housing. The highly volatile combustible fuel rapidly and significantly cools the intake (combustion) air, thereby densifying the air. Thus, the cooled air contains, per unit volume, a greater quantity of combustible matter to be introduced into the engine combustion chamber(s) which consequently increases the explosive combustion charge within the chamber(s) upon ignition of the charge, thereby enhancing engine efficiency and performance.

22 Claims, 4 Drawing Sheets

AIR INTAKE AND CONDITIONING SYSTEM FOR INTERNAL COMBUSTION ENGINES

BACKGROUND OF THE INVENTION

1. Field of the Invention

The present invention relates generally to systems for enhancing the efficiency and performance of internal combustion engines and, more particularly, to systems for conditioning the combustion air introduced into the combustion chamber(s) of such engines in order to increase the energy of combustion within the combustion chamber(s).

2. Description of the Prior Art

A multitude of methods and apparatus are known for enhancing the efficiency and performance of gasoline, diesel or gas internal combustion engines. Performance may be improved by modification of the fundamental engine structure, by enhancing the physical properties of the fuel and/or air which is combusted in the combustion chambers, or any combination these measures. For example, the displacement of the engine may be improved by boring the existing combustion chambers to greater diameters and fitting the enlarged chambers with mating larger diameter pistons. This and related major engine modification procedures, however, can be quite complicated and costly. Furthermore, such procedures must be performed with great care otherwise the engine could be permanently damaged during the modification process.

As a much simpler and less potentially harmful alternative, engine performance may be increased by combustion of highly refined rather than merely acceptable grades of fuel in the engines. In the case of standard gasoline engines, for example, engine performance can be increased somewhat by the use of higher octane fuels generally having an octane rating of about 92 or greater. However, the degree of performance advantage gained exclusively through combustion of higher octane fuels is actually quite limited. Moreover, consistent consumption of highly refined fuels results in materially increased engine operation cost, the justification of which must be weighed against the oftentimes marginal increase in performance achieved through the use of such fuels.

It is also known to augment the physical properties of the air which is combusted in internal combustion engines. Most commonly, these procedures involve increasing engine compression through the use devices for raising the pressure of the charge of air, and thus the quantity of combustible matter (oxygen), which is introduced into the engine combustion chambers. For example, at present, possibly the most widely used apparatus for performing this function is the turbocharger which, as is known, is a device that uses the exhaust gas of an internal combustion engine to drive a turbine that in turn drives a supercharger, i.e., a blower or compressor, which supplies air under high compression to the combustion chambers or cylinders. Although turbochargers and the like are generally effective in performing their designated functions, by being mechanical devices having moving parts operating under high heat and stress (in particular, the turbine which typically turns at greater than 10,000 rpm in conventional applications), they suffer from mechanical inefficiencies and are rather susceptible to failure.

An advantage exists, therefore, for a method and apparatus for increasing internal combustion engine efficiency and performance through the use of essentially non-mechanical means for conditioning engine combustion air in such a manner as to enable super-atmospheric concentrations of combustion air to be supplied to the combustion chamber(s) of the engine.

A further advantage exists for a method and apparatus for increasing internal combustion engine efficiency and performance which avoids major modification of existing engine components.

It is therefore an object of the present invention to provide a method and apparatus for increasing internal combustion engine efficiency and performance through the use of essentially non-mechanical means for conditioning engine combustion air in such a manner as to enable super-atmospheric concentrations, i.e., increased quantities, of combustion air to be supplied to the combustion chambers(s) of the engine.

It is a further object of the present invention to provide a method and apparatus for increasing internal combustion engine efficiency and performance while avoiding major modification of existing engine components.

It is a more particular object of the present invention to provide a system which utilizes a highly volatile combustible fuel in a vaporized state to rapidly and significantly cool the intake or combustion air of an internal combustion engine prior to the introduction of the air into the combustion chamber(s) of the engine, such fuel being either the sole combustion fuel of the engine or a supplement to the fuel normally combusted therein.

It is another object of the present invention to provide a system for increasing the velocity at which combustion air is introduced into the combustion chamber(s) of an internal combustion engine, such system including an air intake housing having multiple ports that form convergent ducts which are activated in a progressive fashion.

Still other objects and advantages of the present invention will become apparent in light of the attached drawings and written description of the invention presented hereinbelow.

SUMMARY OF THE INVENTION

The present invention proposes a method and apparatus for increasing the efficiency and, hence, the performance of a normally aspirated (as contrasted with supercharged) internal combustion engine. In general, these advantages are gained through the use of a combustion air intake housing including a fuel injector for introducing an atomized spray of highly volatile combustible fuel in a region of convergence of a plurality of convergent, progressively operated intake ports formed in the intake housing. The highly volatile combustible fuel rapidly and significantly cools the intake (combustion) air, thereby densifying the air. Thus, the cooled air contains, per unit volume, a super-atmospheric concentration (or greater quantity of combustible matter) to be introduced into the combustion chamber(s) which consequently increases the explosive combustion charge within the chamber(s) upon ignition.

The highly volatile combustible fuel may be either the sole combustion fuel or a supplement to the fuel normally combusted in the engine. The highly volatile fuel is preferably a non-petroleum based fuel, such as, for example, ether, highly pure alcohols such as methanol, and the like. If the fuel normally combusted in the engine is petroleum based then the non-petroleum based supplemental fuel, in addition to its combustion air densification function, serves to reduce consumption of the primary petroleum based combustion fuel. The convergence of the intake ports substantially at the location where the atomized spray of highly volatile fuel is introduced assures that: 1) all of the air intake into the intake housing is cooled and densified by the highly volatile fuel, and 2) a venturi effect is created such that the conditioned, i.e., cooled and densified, combustion air enters the combustion chamber(s) at relatively high velocity thereby achieving good running characteristics in the engine.

The intake housing requires no major modification of existing engine components and may be constructed to as to be retrofittable onto existing intake manifolds.

The vast and increasing use of internal combustion engines has created problems of dependency on petroleum products, a dwindling of their reserves, and increased production of harmful emissions resulting from combustion of these fuels. In efforts to control emissions output, gasoline engines have been for at least the last decade almost universally designed to operate on lead-free gasoline. While converting to these fuels, however, a problem of low octane fuel was created. Consequently, low compression engines were introduced to eliminate engine knocking and pinging that these fuels produced when combusted in high compression engines. As expected, these low compression engines produced less horsepower per cubic inch. In an effort to overcome this problem, additional costly refining procedures were developed so that a larger proportion of aromatic hydrocarbons with higher octane numbers were produced in fuel mixtures which enable more efficient higher compression engines to be used once again, albeit at greater operating cost.

Through the present invention it has been discovered that engine compression ratios can be raised still higher. In one preferred embodiment, not only is engine compression materially increased, but petroleum fuel consumption and harmful emissions can actually be reduced. This is accomplished through first conditioning the combustion air with the highly volatile non-petroleum based combustion fuel in the manner described hereabove in order to densify the combustion air prior to mixing thereof with the petroleum fuel normally combusted in the engine. This particular embodiment of the present invention increases engine power, while producing cleaner emissions and reduced petroleum fuel consumption.

Described in U.S. Pat. No. 4,402,296 is a method and apparatus for supplying an internal combustion engine with a mixture of gasoline and preheated alcohol. This reference mentions no preconditioning of the combustion air and no increase in engine compression ratio or efficiency.

U.S. Pat. No. 4,031,864 describes a dual fuel system for internal combustion engines wherein the fuels (methanol and gasoline) are contained in and dispensed into the engine from a single fuel tank. As in U.S. Pat. No. 4,402,296, the combustion air is not expressly conditioned for densification by the methanol prior to its mixture with the gasoline. The fuels and air are mixed simultaneously.

A related patent, U.S. Pat. No. 4,019,477 describes a dual fuel system for an internal combustion engine including a primary carburetor for introducing a gasoline and air mixture into an engine intake manifold and a secondary carburetor in parallel with the primary carburetor for introducing a separate mixture of air and alcohol into the intake manifold downstream of the primary carburetor. Aside from being a carburetion system as opposed to the fuel injection system of the present invention, the invention described in U.S. Pat. No. 4,019,477 requires two separate fractions of combustion air to be separately mixed with alcohol and gasoline, respectively, and thereafter mixed together. Whereas, in accordance with the "dual fuel" embodiment of the present invention, the air which ultimately becomes mixed with the primary combustion fuel (e.g., gasoline) is the same air which is first conditioned by the highly volatile combustion fuel. In other words, according to the present invention, all of the combustion air sequentially is first densified by the highly volatile combustion fuel and then that conditioned air becomes mixed with the primary fuel for combustion in the engine. With such an arrangement, construction is simplified and 100 percent of the combustion air rather than a fraction thereof is advantageously treated by the highly volatile combustion fuel.

U.S. Pat. No. 4,016,846 relates to internal combustion engines of the type having an auxiliary combustion chamber associated with each main combustion chamber and connected thereto by a torch opening. In the device disclosed in that patent, a rich mixture is supplied from one carburetor barrel to the auxiliary combustion chambers and a lean mixture is supplied from another carburetor barrel to the main combustion chambers. In practice, three separate carburetor barrels are employed, one for the rich mixture and two for the lean mixture. Of the latter two, one is brought into action only when the engine is operating under heavy load.

In accordance with that invention, the rich mixture and one of the lean mixtures are heated by the exhaust gases to assure full vaporization of the mixtures, but the lean mixture from the remaining carburetor barrel is not heated. Since this barrel comes into action only when the engine is operating under heavy load, it supplies a relatively cool component to the mixture to improve volumetric efficiency of the engine.

Accordingly, that invention contemplates the provision of cooperating intake and exhaust manifolds in which the heat of the exhaust gases prevents condensation of air-fuel mixtures admitted into the main and auxiliary combustion chambers, while also supplying additional lean air-fuel mixture which is unheated when maximum horsepower is required. Nowhere in U.S. Pat. No. 4,016,846 is there suggestion of directly lowering the temperature of the combustion air in order to increase the concentration or density thereof. Moreover, the present invention involves cooling of the combustion air throughout the entire engine load and/or rpm spectrum of the engine for maximum performance at low, middle and high rpm and/or load conditions.

DESCRIPTION OF THE PREFERRED EMBODIMENTS

Figure 1:
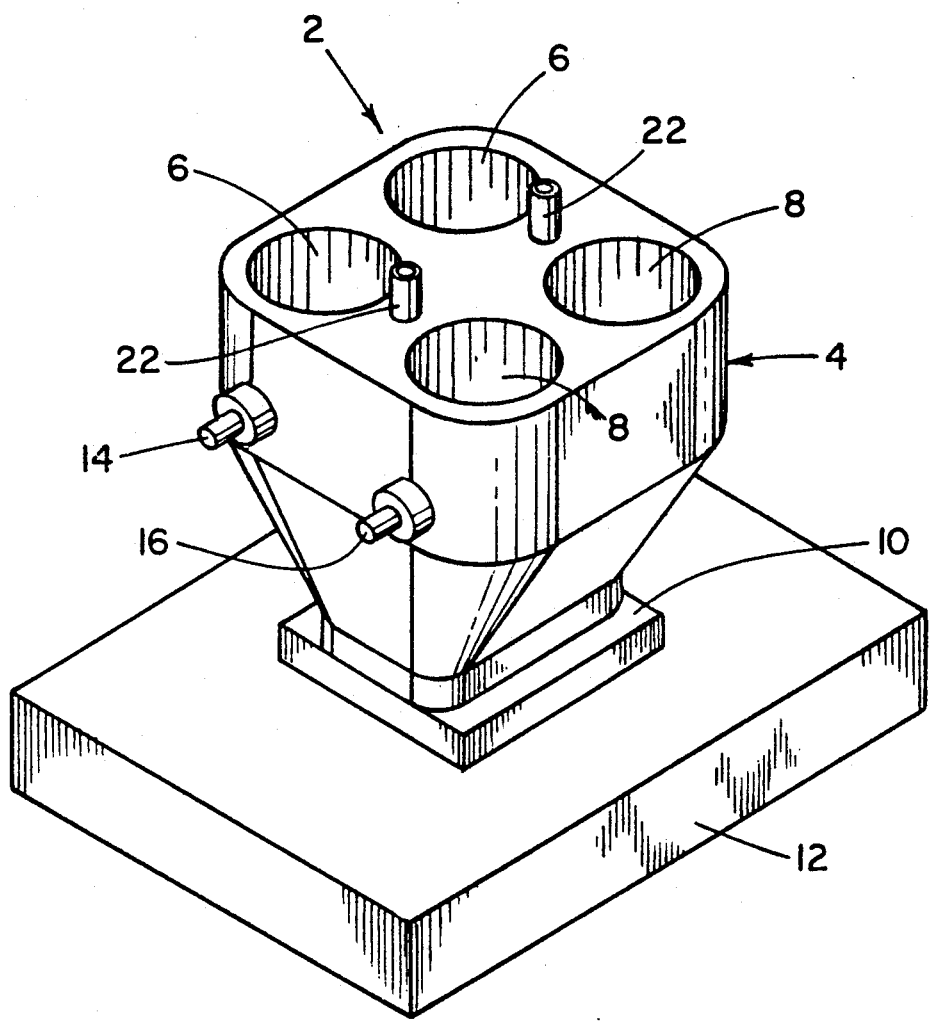
FIG. 1 is a perspective view of an internal combustion engine air intake and conditioning apparatus constructed in accordance with a first embodiment of the present invention.

Referring to FIG. 1, there is depicted a first preferred embodiment of an air intake and conditioning apparatus 2 constructed in accordance with the present invention which is adaptable for use with a single or multiple cylinder, normally aspirated, internal combustion engine. The present invention may also be suitably employed with engines other than the reciprocating type.

Figure 3:
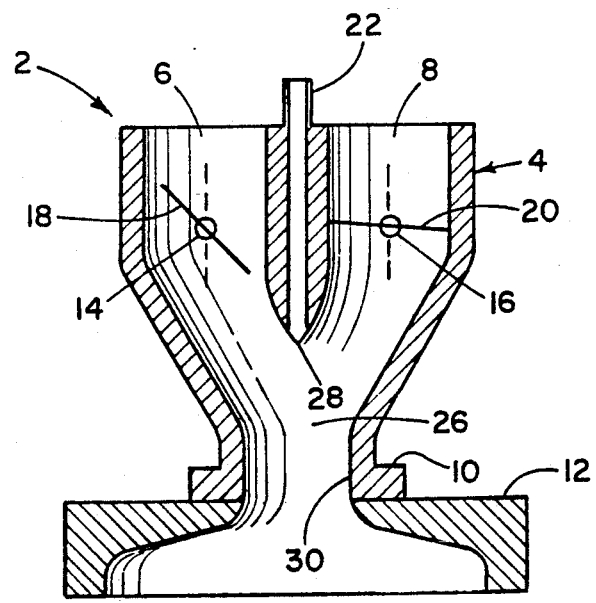
FIG. 3 is a sectional view taken along line III—III of FIG. 2.
Figure 4:
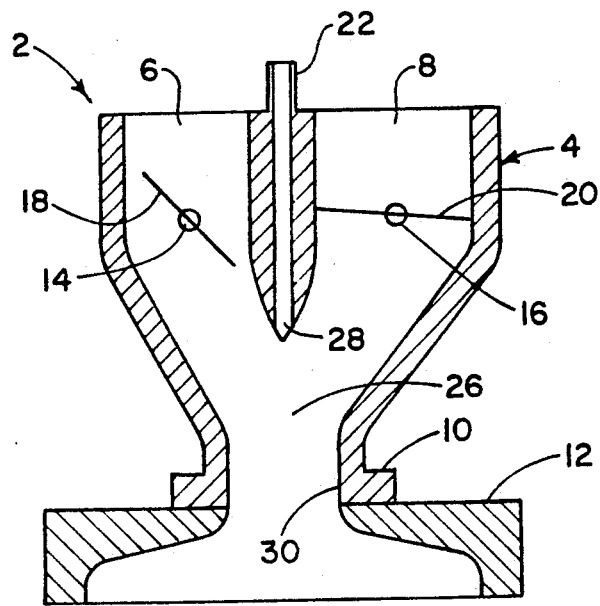
FIG. 4 is a view similar to FIG. 3 illustrating a second embodiment of the present invention.
Figure 5:
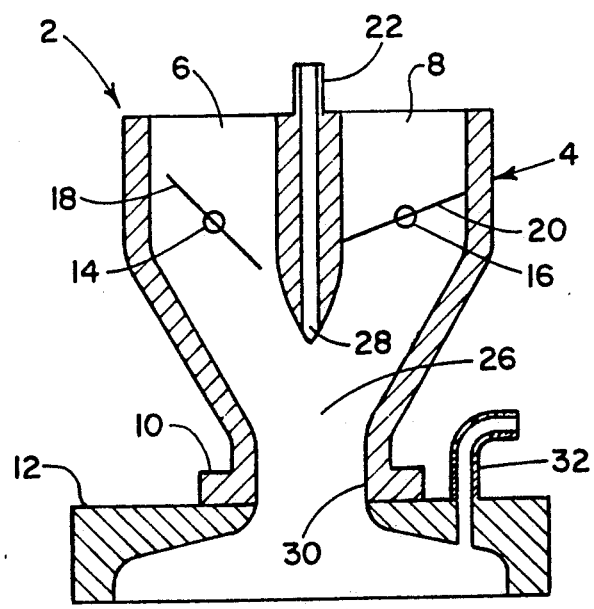
FIG. 5 is a view similar to FIG. 3 illustrating a third embodiment of the present invention.

Apparatus 2 includes a multiple port intake housing 4 having primary intake ports 6 and secondary intake parts 8 formed therein and a base 10 for mounting the housing to an intake manifold 12 which in turn is mounted to an internal combustion engine in the known manner. The air intake through ports 6 and 8 is adjustably controlled via a linkage, as is known, connecting the vehicle accelerator pedal (not illustrated) with the pivot rods 14 and 16 of flapper-type throttle valves 18 and 21 (FIGS. 3, 4, and 5). While two primary intake ports 6 and two secondary intake ports 8 are provided in the intake housing 6 of the exemplified embodiment of the intake housing 4 shown in FIG. 1, it is possible to provide only a single primary and a single secondary intake port or, alternatively, greater than two primary and secondary intake ports if such is desired. Moreover, for maximum performance, it is most preferred that a single primary intake port 6 and a single secondary intake port 8 situated opposite thereto service a single engine cylinder; for example, in such a situation the particular air intake housing 4 of FIG. 1 would thus service two engine cylinders. It will be understood, however, that the apparatus shown in FIG. 1 could serve, depending upon the construction of manifold 12, any number of cylinders. Alternatively, several similarly constructed apparatus containing one or more pairs of primary and secondary intake ports 6 and 8 could be mounted to intake manifold 12 to achieve any desired degree of enhanced engine performance within the confines of the present invention.

Figure 2:
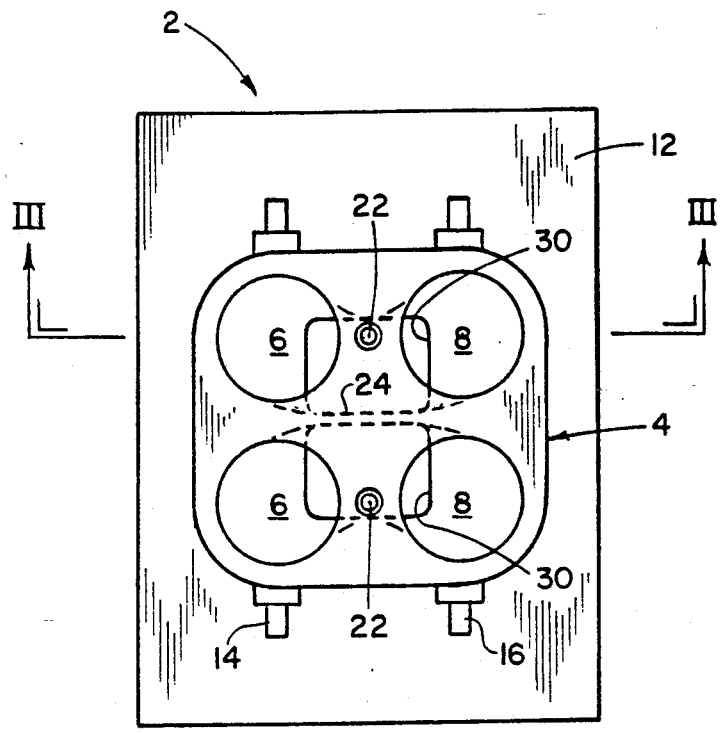
FIG. 2 is plan view of the apparatus seen in FIG. 1 with certain elements omitted for purposes of clarity.

Continuing, located between each associated pair of primary and secondary intake ports 6 and 8 is a fuel injector 22 for introducing an atomized spray of highly volatile, preferably non-petroleum based, combustible fluid into a convergent region formed by the paths of intake ports 6 and 8 for conditioning the intake air in a manner to be described hereinafter. As perhaps best appreciated through observation of FIG. 2, wherein like references indicate similar elements, as is true in the remaining views, if two or more pairs of intake ports 6 and 8 are provided in intake housing 4, each associated pair of intake ports 6 and 8 is separated from an adjacent pair by a dividing wall 24. Note that, for purposes of clarity of illustration, flapper-type throttle valves 18 and 20 are not shown in FIG. 2.

As seen in FIG. 1 and, particularly, FIGS. 3–5, the lower portion of intake housing 4 tapers downwardly and inwardly. The major reasons for such a configuration are two-fold. First, the paths formed by an associated pair of intake ports 6 and 8 are caused to form a convergent region 26 which lies directly in the path of a nozzle opening 28 of the fuel injector 22 whereby all air entering the intake housing is conditioned by the spray from the injector. And second, as the vacuum created by the intake stroke of the piston or pistons causes combustion air to be drawn into and through the intake housing, the air is through caused by virtue of the Venturi Effect to exit the intake housing through discharge openings 30 (each of which are of less cross-sectional area than either of the cross-sectional areas of their associated pairs of intake ports 6 and 8) at increased velocity such that the charge of air will enter the combustion chambers of the engine at relatively high velocity whereby smooth running engine characteristics will be achieved.

Figure 7:
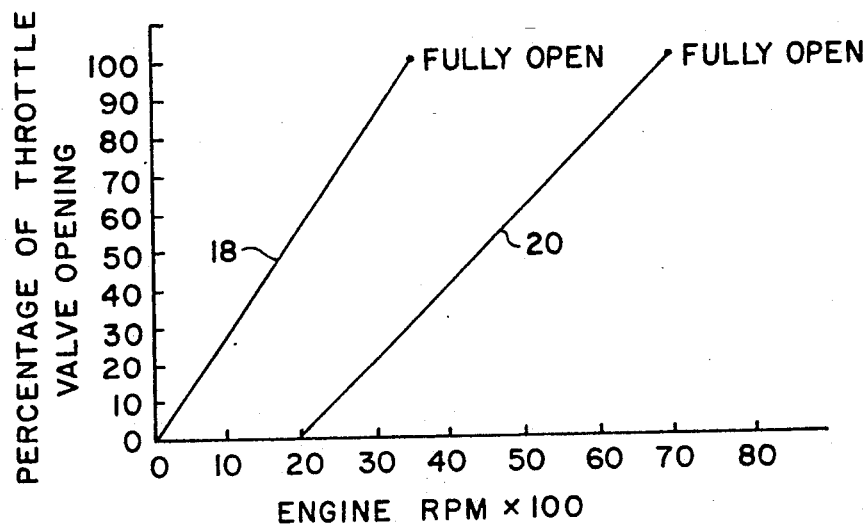
FIG. 7 is a graphical representation of the amount of throttle valve opening (in percent) vs. engine rpm for the primary and secondary intake ports of the air intake and conditioning apparatus of the present invention.

As noted hereinabove, central to the present invention is that all of the intake air used for combustion is subject to conditioning by the spray of highly volatile combustible fluid discharged from fuel injector(s) 22. In operation, generally only the primary intake port(s) 6 are open and operating at the low rpm conditions, i.e., less than about 2000 rpm, experienced at engine idle and low load conditions. At about 2000 rpm, under the increased depressive force of an operator's foot, the linkage connecting the vehicle accelerator pedal to the throttle valve pivot rods 14 and 16 causes the pivot rod 16 of the throttle valve 20 in secondary intake port 8 to begin pivoting thereby opening throttle valve 20 while, simultaneously, the throttle valve 18 in primary intake port 6 is caused to open still further. At about 3500 rpm, throttle valve 18 is fully open, whereas throttle valve 20 is caused to progressively open through the mid to high rpm range and become fully open at about 7000 rpm or greater (FIG. 7). The fully open or 100 percent open positions of throttle valves 18 and 20 are represented by the vertical dashed lines in FIG. 3. With the presently disclosed convergent path construction of the intake housing 4, all of the air which passes through the intake housing is densified by cooling caused by direct exposure thereof to at least a portion of the flow of an atomized spray of highly volatile and rapidly evaporating combustible fuel discharged from fuel injector nozzle opening 28. Thus, all air which enters the intake housing is directed into the path of the cooling atomized spray and becomes instantaneously cooled and reduced in volume, thereby creating additional vacuum in the intake housing above that which is caused by the vacuum stroke of the engine pistons alone. The additional vacuum in turn causes additional air molecules to be drawn into the intake housing to occupy the space left void by the rapidly cooled air such that the air exiting the housing through opening or openings 30 is substantially more dense than the air drawn in through intake ports 6 and 8. That is, all of the air of combustion is raised to a super-atmospheric concentration or density by virtue of its passage through and treatment in the intake housing 4.

Accordingly, since the volume of the combustion chambers is constant and defines the volume of gas which the engine can displace in one revolution, by virtue of the present invention, compression is raised by increasing the quantity of inducted air molecules and, hence, the density and pressure of the charge of combustion air which is introduced into combustion chambers. By increasing the compression, which as noted supra can also be viewed as increasing the quantity of combustible matter introduced in the combustion chambers, the explosive combustion force within the chambers and, therefore, overall engine performance are increased. The present invention achieves this beneficial effect without reliance upon mechanical supercharging and the attendant inefficiencies and potential difficulties associated therewith. Moreover, the venturi created at the exit openings 30 assures that the charge is introduced into the combustion chambers at high velocity thereby assuring smooth running of the engine.

The following discussion addresses the similarities and differences between the exemplified embodiments of the present invention illustrated in FIGS. 3, 4 and 5. First, common to all three embodiments, as noted hereinabove, is an intake housing 4 including at least one pair of associated and converging primary and secondary air intake ports 6 and 8, respectively. All of the air introduced through the intake ports is directly exposed to at least a portion of the flow of an atomized spray of highly volatile, and preferably non-petroleum based, combustible fuel for cooling and densification thereof.

In the particular embodiment of the air intake and conditioning apparatus 2 shown in FIG. 3 (and FIGS. 1 and 2) the horizontal cross-sectional areas of the primary and secondary intake ports are substantially equal. Furthermore, the highly combustible and highly volatile fuel injected through fuel injector 22 serves as the sole fuel for powering the engine. That is to say, in operation, a portion of the fuel is used to cool and densify the combustion air while the remainder is used as the internal combustion fuel.

The particular embodiment of the invention depicted in FIG. 4 reveals an apparatus similar in construction and operation to that illustrated in FIG. 3 except that, in this case, the diameters or horizontal cross-sectional areas of the secondary intake ports 8 are substantially greater than those of primary intake ports 6. Again, as in the FIG. 3 embodiment, the highly combustible and highly volatile fuel injected through injector 22 is the sole powering fuel for the engine.

The FIG. 5 embodiment of the present invention represents what may be aptly termed a "dual fuel" construction of the air intake and conditioning apparatus 2. Where this particular embodiment departs from that shown in both FIGS. 3 and 4 is in the inclusion of at least one fuel injector 32 for injecting into the interior of the intake manifold 12 (or the interior of the combustion chambers) the primary, and normally petroleum based, engine combustion fuel, e.g., gasoline. Just as in all of the previously described embodiments, all of the air introduced into the intake housing 4 is first conditioned, i.e., cooled and densified, by exposure to the highly volatile and highly combustible fuel discharged form injector nozzle 28. The conditioned air then passes through exit opening 30 and mixes with the primary combustion fuel either in the manifold 12 or in the combustion chambers. With such a construction, only that amount of highly volatile fuel which is needed to properly cool the combustion air to a preferred temperature for achieving a preferred air density is injected by nozzle 22. Essentially all of the fuel used in combustion, therefore, is introduced through fuel injectors 32. Usage of this particular embodiment of the present invention in conjunction with a gasoline powered internal combustion engine, for example, not only increases engine performance but also reduces fuel consumption and harmful emissions since the quantity of fuel required to achieve a specified explosive force in a combustion chamber is proportionately lessened by the increased quantity of combustible oxygen introduced into the chamber by the densified charge of air.

Figure 6:
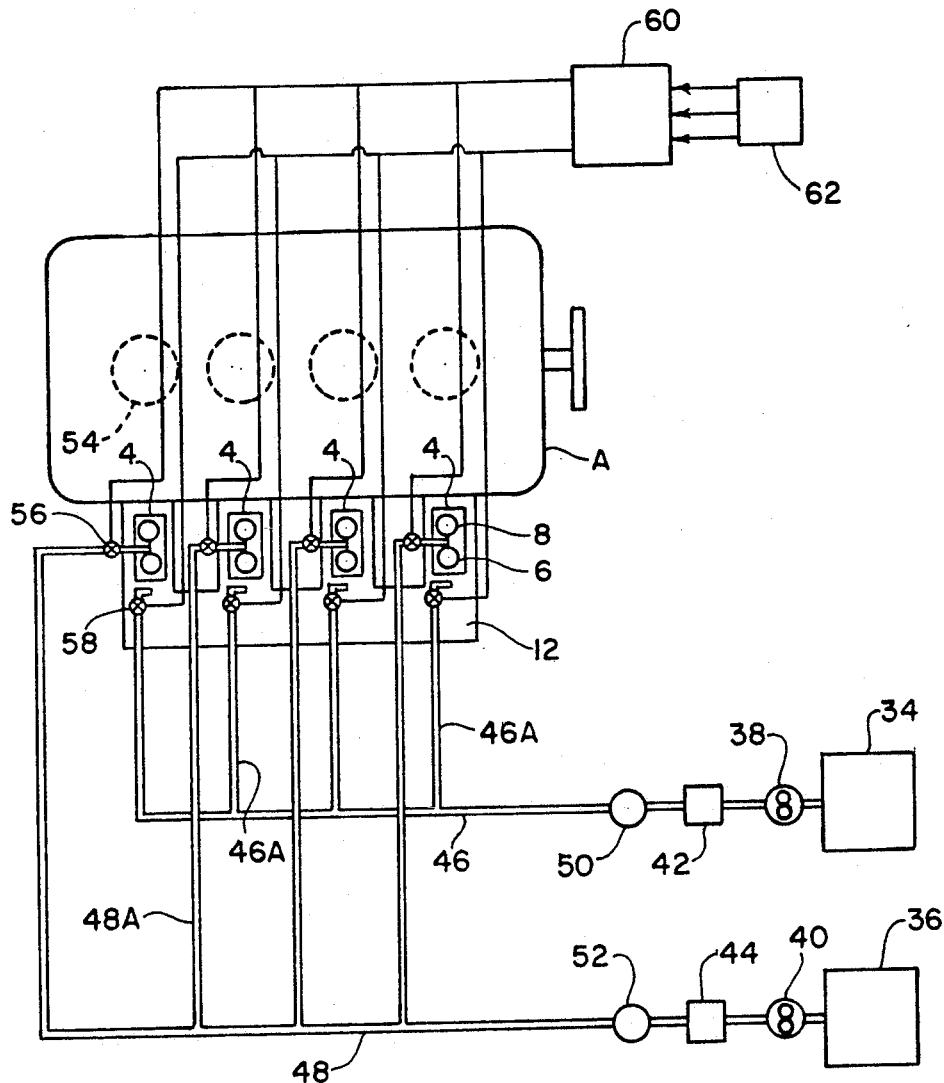
FIG. 6 is a schematic representation of the operational control of the air intake and conditioning apparatus of the present invention.

Turning to FIG. 6, there is disclosed a schematic representation of an operational control system, similar in many regards to that described in U.S. Pat. No. 4,402,296, which is suitable for use with any dual fuel application of the air intake and conditioning system of the present invention. In this figure, it is seen that each air intake housing 4 is provided with a single primary intake port 6 and a single secondary intake port 8.

Referring now in more detail to the drawing, a system is disclosed for carrying out the method according to the invention wherein an internal combustion engine A is supplied with gasoline from a first fuel source 34 which may be lead-free gasoline and a second fuel source, alcohol, preferably in the form of ethyl alcohol, is provided at 36. Separate pumps 38 and 40 are provided, respectively, for delivering the fuels to the air intake housings 4 and the intake manifold 12 of the internal combustion engine. Suitable pressure regulators 42 and 44 are carried in the respective fuel lines 46 and 48. The electrically driven pumps 38 and 40 and respective pressure regulators maintain fuel pressure within fuel distributors 50 and 52 and fuel lines 46 and 48 respectively.

As illustrated, gasoline fuel is injected into the intake manifold opposite the intake valve(s) of the various combustion chambers 54. Conventional fuel injection valves 56 may be provided for injecting the alcohol and fuel injector valves 58 may be provided for injecting the gasoline. Branch fuel delivery lines 46A deliver gasoline from distributor 50 to the appropriate gasoline fuel injector valve and branch lines 48A deliver the alcohol to the corresponding alcohol fuel injector valve. A conventional electronic fuel injection unit 60 is provided for controlling the pulse-width duration which holds the fuel injector valves open for a predetermined length of time in order to deliver a predetermined quantity of fuel. The fuel injection unit 60 determines the ratio and proportion of alcohol fuel which need be injected along with the gasoline for different engine operation conditions in response to parameters fed to the unit 60 from conventional sensors illustrated schematically at 62 such as engine speed, intake manifold pressure, throttle position, air temperature, exhaust temperature, etc. It will be understood that a similar but somewhat simplified operational system would be employed in the event that a single highly volatile fuel such as alcohol was used both as the intake air conditioning means and as the engine combustion fuel such as in the embodiments of the present invention depicted in FIGS. 1–4.

Along with the many advantages discussed hereinabove, the air intake conditioning system of the present invention, by being capable of substantially increasing engine performance, enables smaller cubic inch engines than are presently employed to be used in powering automotive vehicles while maintaining comparable if not superior horsepower. And, by using smaller engines, fuel efficiency is increased, thereby reducing operational costs and depletion of petroleum reserves. Furthermore, the enhanced compression ratios achievable by gasoline engines equipped in accordance with the present invention permits conventional rather than high octane fuels to be burned in the engine without sacrificing performance, which also acts to reduce operational costs.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

We claim:

1. A system for enhancing the performance of an internal combustion engine having at least one combustion chamber, said system comprising:
   air intake housing structure attached to intake manifold structure of said engine;
   said air intake housing structure includes at least one associated pair of air intake ports, each of said at least one associated pair including a primary air intake port defining a first air flow path and a secondary air intake port defining a second air flow path;
   means carried by said air intake housing structure for cooling and densifying all air to be used for combustion in said engine, said means for cooling and densifying enabling super-atmospheric concentrations of combustion air to be introduced into said at least one combustion chamber for combustion therein; and
   means associated with said air intake housing structure for subjecting all of said combustion air to direct exposure to said means for cooling and densifying.

2. The system of claim 1 wherein said means for subjecting all of said combustion air to direct exposure to said means for cooling and densifying comprises a convergent region common to the flow paths of said primary and secondary air intake ports of each of said at least one associated pair of air intake ports.

3. The system of claim 2 wherein said at least one associated pair of air intake ports comprises a plurality of associated pairs of air intake ports.

4. The system of claim 3 further comprises means for separating adjacent ones of said plurality of associated pairs of air intake ports.

5. The system of claim 4 wherein said air intake housing structure includes separate discharge opening means associated with each of said plurality of associated pairs of intake ports for discharging said super-atmospheric concentrations of combustion air into said intake manifold structure of said engine.

6. The system of claim 5 where each said discharge opening means is of lesser cross-sectional area than either of the pair of intake ports associated therewith such that a venturi is created upon discharge of said combustion air through said discharge opening means.

7. The system of claim 1 wherein said means for cooling and densifying comprise means for introducing a highly volatile first combustion fuel into said air intake housing structure, said cooling and densifying being effected by rapid evaporation of at least a portion of the highly volatile first combustion fuel introduced into said air intake housing structure.

8. The system of claim 7 wherein said means for introducing comprise at least one fuel injector for introducing said first combustion fuel into said air intake housing structure.

9. The system of claim 7 wherein said first combustion fuel is the sole combustion fuel combusted in said engine.

10. The system of claim 7 wherein said first combustion fuel is non-petroleum based.

11. The system of claim 10 wherein said first combustion fuel is alcohol.

12. The system of claim 10 further comprising means for introducing a second combustion fuel into said engine such that said second combustion fuel mixes with said super-atmospheric concentrations of combustion air to permit combustion therewith within said at least one combustion chamber.

13. The system of claim 12 wherein said second combustion fuel is petroleum based.

14. The system of claim 13 wherein said means for introducing a second combustion fuel into said engine comprise at least one fuel injector for introducing said second combustion fuel into said intake manifold structure of said engine.

15. The system of claim 13 further comprising means for controlling both said means for introducing said first combustion fuel and said means for introducing said second combustion fuel in response to sensing of engine operation conditions.

16. The system of claim 1 wherein said engine is normally aspirated.

17. A dual fuel injection system for enhancing the performance of an internal combustion engine having at least one combustion chamber, said system comprising:
   air intake housing structure attached to intake manifold structure of said engine;
   said air intake housing structure includes at least one associated pair of air intake ports, each of said at least one associated pair including a primary air intake port defining a first air flow path and a secondary air intake port defining a second air flow path;
   means for introducing alcohol into said air intake housing structure for cooling and densifying all air to be used for combustion in said engine, said means for introducing alcohol enabling super-atmospheric concentrations of combustion air to be introduced into said at least one combustion chamber for combustion therein, said cooling and densifying being effected by rapid evaporation of at least a portion of the alcohol introduced into said air intake housing structure;
   means associated with said air intake housing structure for subjecting all of said combustion air to direct exposure to said means for introducing alcohol into said air intake housing structure; and
   means for introducing a second combustion fuel into said engine such that said second combustion fuel mixes with said super-atmospheric concentrations of combustion air to permit combustion therewith within said at least one combustion chamber.

18. A method for enhancing the performance of an internal combustion engine having at least one combustion chamber, said method comprising the steps of:
   (a) attaching to an intake manifold structure of said engine an air intake housing structure including at least one associated pair of air intake ports of which a primary air intake port defines a first air flow path and a secondary air intake port defines a second air flow path;

(b) using means includes in said air intake housing structure for cooling and densifying all air to be used for combustion in said engine in order to produce super-atmospheric concentrations of combustion air to be introduced into said at least one combustion chamber; and (c) introducing said super-atmospheric concentrations of combustion air into said at least one combustion chamber for combustion therein.

19. The method of claim 18 wherein said means for cooling and densifying includes means for introducing a highly volatile first combustion fuel into said air intake housing structure, and step (b) further comprises introducing said highly volatile first combustion fuel into said air intake housing to effect said cooling and densifying through rapid evaporation of at least a portion of the highly volatile first combustion fuel introduced into said air intake housing structure.

20. The method of claim 19 wherein said first combustion fuel is the sole combustion fuel combusted in said engine.

21. The method of claims 20 wherein said first combustion fuel is non-petroleum based.

22. The method of claim 19 further comprising the step of:

(d) introducing a second combustion fuel into said engine such that said second combustion fuel mixes with said super-atmospheric concentrations of combustion air to permit combustion therewith within said at least one combustion chamber.

* * * * *